Figure 1:
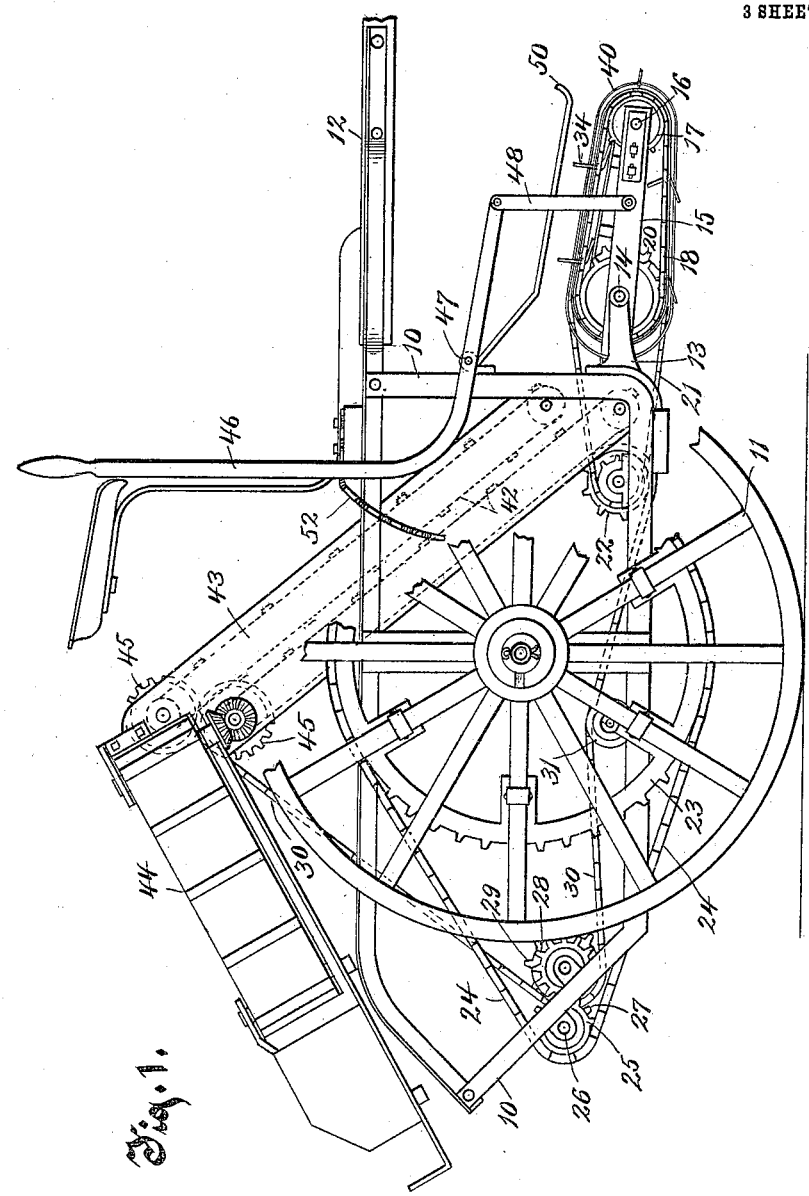

O. L. PERRIGO.
HARVESTER.
APPLICATION FILED AUG. 27, 1908.

960,392.

Patented June 7, 1910.

3 SHEETS—SHEET 1.

Witnesses.

Inventor.
Orville L. Perrigo,
By Benedict, Morsell & Caldwell
Attorneys.

O. L. PERRIGO.
HARVESTER.
APPLICATION FILED AUG. 27, 1908.
960,392.
Patented June 7, 1910.
3 SHEETS—SHEET 2.
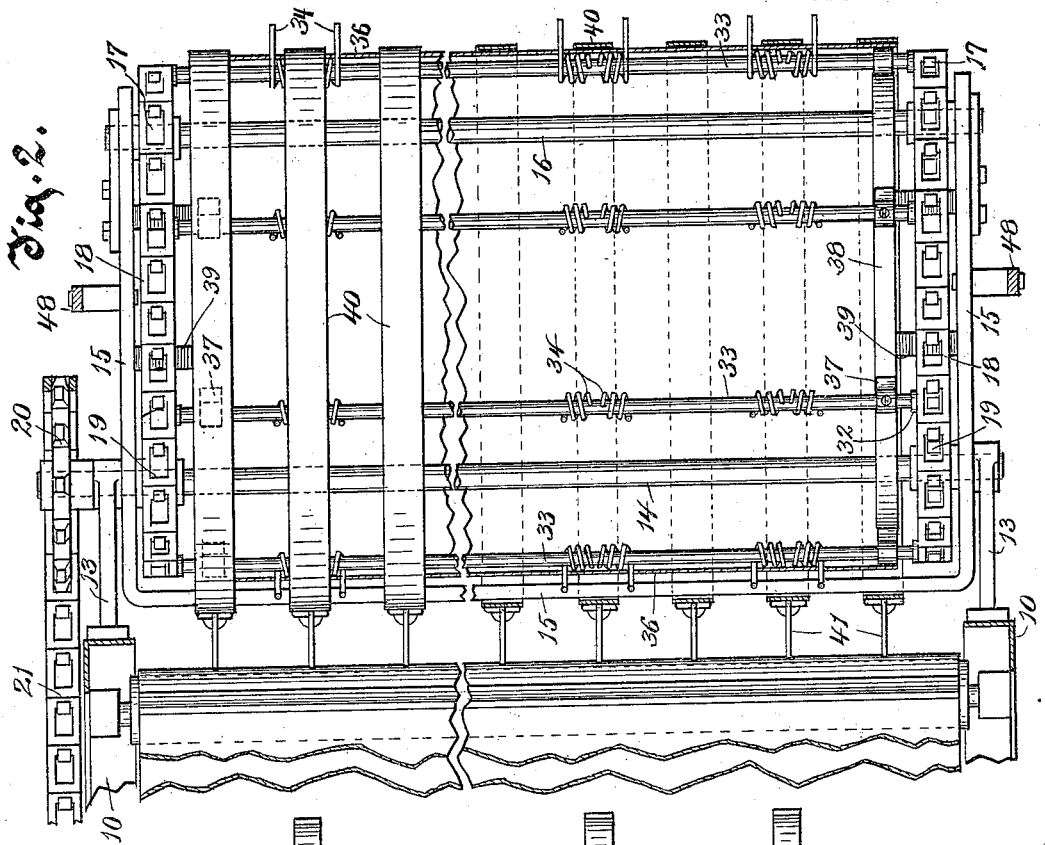
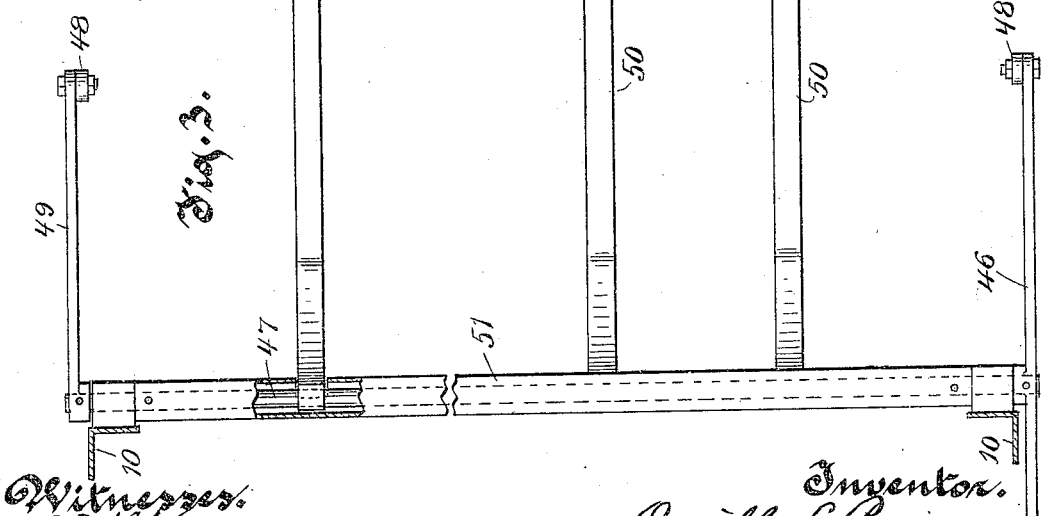

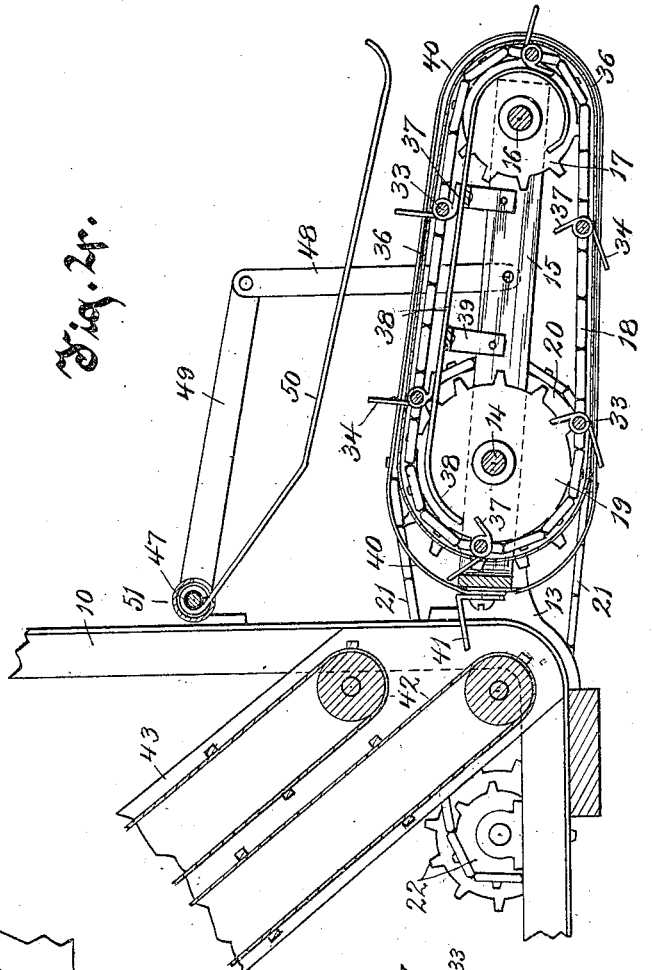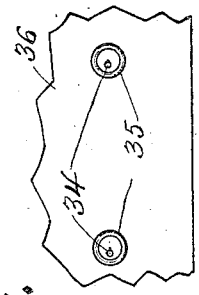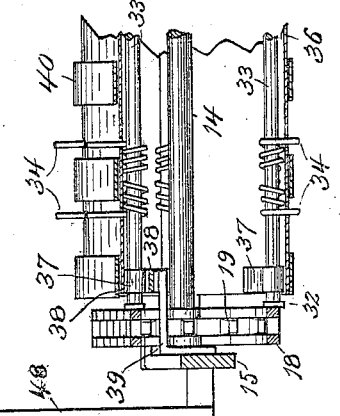

UNITED STATES PATENT OFFICE.

ORVILLE L. PERRIGO, OF OSHKOSH, WISCONSIN, ASSIGNOR OF ONE-HALF TO OSHKOSH GRASS MATTING COMPANY, OF OSHKOSH, WISCONSIN, A CORPORATION OF WISCONSIN.

HARVESTER.

960,392.  Specification of Letters Patent.  Patented June 7, 1910.

Application filed August 27, 1908. Serial No. 450,418.

*To all whom it may concern:*

Be it known that I, ORVILLE L. PERRIGO, residing in Oshkosh, in the county of Winnebago and State of Wisconsin, have invented new and useful Improvements in Harvesters, of which the following is a description, reference being had to the accompanying drawings, which are a part of this specification.

This invention has for its object to provide means for gathering crops and delivering them to a binding or other mechanism.

A particular object of the invention is to provide mechanism of a simple construction for effectively gathering cut material without waste thereof and being adjustable to travel nearer to or farther from the ground.

With the above and other objects in view the invention consists in the harvester herein claimed, its parts and combination of parts and all equivalents.

Referring to the accompanying drawings in which like characters of reference indicate the same parts in the different views:

Figure 1 is a side elevation of a harvester and binder constructed in accordance with this invention; Fig. 2 is a sectional plan view of the gathering mechanism; Fig. 3 is a detail view of the presser arm construction; Fig. 4 is a sectional elevation of the gathering mechanism; Fig. 5 is a sectional front view of a portion thereof; and Fig. 6 is a detail view of a fragment of the apron.

In these drawings 10 indicates the frame which is mounted upon wheels 11 and is drawn by means of horses attached to a tongue 12. At the lower front corners of the frame are brackets 13 forming bearings for a shaft 14 on which a swinging U-shaped gatherer frame 15 is pivotally mounted. In the forwardly projecting ends of the U-shaped frame is journaled a shaft 16 carrying sprocket wheels 17 near its ends with chains 18 passing around them and also around larger sprocket wheels 19 on the shaft 14. The two chains 18 receive motion from the shaft 14 which has a sprocket wheel 20 on its end, as shown in Fig. 2, which is connected by a chain 21 with a double sprocket wheel 22 journaled on the frame and driven from large sprocket wheels 23 on the traction wheels 11. This driving connection comprises chains 24 connecting large sprocket wheels 23 with sprocket wheels 25 on a shaft 26, which has a gear wheel 27 meshing with a gear wheel 28 carrying a sprocket wheel 29, around which a chain 30 passes and travels over a chain tightener 31 and around the double sprocket 22.

At intervals the links of chains 18 are provided with sockets 32 to loosely receive the ends of rods 33 which thus connect the two chains and constitute an endless conveyer therewith. The rods 33 have fixed on them a series of pairs of spring fingers 34 which are coiled about the rods and then project therefrom and through eyelets 35 in an apron or belt 36 forming a covering for said conveyer. The rods 33 have guide shoes 37 secured to them near their ends, which ride on guide tracks 38 carried by brackets 39 on the ends of frame 15, as shown in Fig. 4. The tracks 38 only extend from a position beneath the shaft 16 around the front of said shaft and along the upper course of the chains, terminating at a position to the rear of shaft 14, where the guide shoes 37 may ride off of them just before the spring fingers 34 engage the rear part of the frame 15. The rods 33 are turned by means of the guide shoes 37 striking the front end of the tracks 38 to cause their spring fingers 34 to stand approximately at right angles to the surface of the apron 36 and travel in this position to engage the grain or other crops and lift them at the front of the gatherer onto the apron and then move them rearwardly thereon.

To relieve the apron of the weight of the material there are a number of oval shaped guard strips 40 secured to the rear end of the frame 15 and passing around the conveyer or gatherer, remaining at a short distance from the apron 36 at all parts. These guard strips are regularly spaced from one side of the gatherer to the other and the pairs of spring fingers 34 are preferably arranged so as to straddle certain of them, projecting thereabove as shown in Fig. 4. The guard strips 40 therefore support the material in its travel from the front of the gatherer to the rear, and as it recedes from the rear end of the apron to connect with the frame 15 it strips the material from the spring fingers 34, so that when they are released by the guide shoes 37 passing off of the tracks 38 said spring fingers may swing idly during their return forward movement without obstructing the movement of the chains while the material stripped from them is led by rearwardly projecting fingers 41 on the frame 15 to a pair of conveyer belts 42 extending up an inclined conveyer box 43 to the binding mechanism 44 of ordinary construction. The conveyer belts 42 are geared together by intermeshing gears 45 which are driven by the chain 30 before referred to.

The frame 15 carrying the gatherer as described is adapted to be swung upon the shaft 14 so as to bring its front end nearer to or farther from the ground by means of a hand-lever 46 rigidly carried on a shaft 47 journaled in brackets on the front of frame 10, the lower end of said hand lever projecting forwardly and connected by a link 48 with one of the sides of frame 15 in advance of its pivotal connection on the shaft 14. Said shaft 47 has an arm 49 rigidly connected to its other end corresponding with the lower end of the hand lever 46 and likewise connected by a link 48 with the other side of the frame 15. By means of this connection the swinging of the hand lever 46 rearwardly serves to lift the front end of the gatherer without interfering with its driving connection or its operation in any way, thus enabling the operator to avoid obstructions in the path of the machine and to locate the front edge of the gatherer at the desired elevation for producing the best effect.

In order that the material may be held tightly against the gatherer there are a number of bent spring presser arms 50 loosely mounted on the shaft 47 and projecting forwardly over the gatherer, as shown in Fig. 4, but which are kept from falling upon the gatherer by being confined in their movements on the shaft 47 by a tubular sleeve 51 rigidly mounted on said shaft and through slots of which said arms project. The slots of the tubular sleeve 51 are of sufficient length to permit of the arms being moved upwardly by the material when it is of a sufficient mass, but the arms strike the lower edges of the slots to prevent their moving closer to the gatherer than as shown in Fig. 4. When the shaft 47 is turned by the hand lever 46 for lifting or lowering the gatherer the sleeve 51 by turning therewith causes the arms 50 to correspondingly raise or lower to maintain their proper distance from the gatherer. A suitable rack 52 is provided for the hand lever 46 to enable it to be locked in any position to which it is adjusted.

With this invention the gatherer may be raised or lowered at will to accommodate it to the various crops and the various conditions thereof and also for the purpose of avoiding obstructions in the path of the machine, while affording a positive and efficient feeding means for quickly drawing the material into the conveyer by which it is taken to the binder. The automatic control of the projecting spring fingers enables the gatherer to be operated close to the ground without danger of the fingers obstructing the operation by engaging the ground and the construction of the gatherer is such, that while effectively feeding material it as effectively strips itself or the material at the proper time and is therefore not liable to become clogged thereby.

What I claim as new is:

1. A harvester, comprising a main frame, a gatherer frame pivotally mounted thereon, a conveyer on the gatherer frame, a shaft journaled in the main frame, a hand lever secured thereto, a link connecting the hand lever with the gatherer frame, arms pivotally mounted on the shaft and extending above the conveyer of the gatherer frame, a tubular sleeve fixed on the shaft having slots through which the arms extend, whereby the arms are free to swing upwardly and are limited in their downward movement to a position at a distance from the conveyer and whereby the movements of the hand lever for raising and lowering the gatherer frame serve to correspondingly raise or lower said arms.

2. A harvester, comprising a main frame mounted on wheels, driving sprockets on said wheels, driving mechanism driven from said sprockets, an inclined elevator having conveyer belts driven by the driving mechanism, a binder operated by the driving mechanism, a gatherer frame pivotally mounted on the main frame, a shaft on the gatherer frame on the pivotal axis thereof, a sprocket wheel on said shaft, a chain connecting said sprocket wheel with the said driving mechanism, a second shaft on the gatherer frame, sprocket wheels on said shafts, chains passing around said sprocket wheels, sockets carried by links of the chains, rods loosely mounted in said sockets to turn independently of the chains, guide shoes on the rods, tracks secured to the gatherer frame and extending in the path of the guide shoes by means of which the rods are caused to assume a definite position with relation to their movement during a portion of their cycle of movement, spring fingers on the rods, arms pivotally mounted on the frame and extending above the conveyer formed by the rods, and means for swinging the gatherer frame and the arms to vary their distance from the ground.

In testimony whereof, I affix my signature, in presence of two witnesses.

ORVILLE L. PERRIGO.

Witnesses:
HENRY BARBER,
ADOLPH MENZEL.